(12) United States Patent
Moser

(10) Patent No.: US 7,324,294 B2
(45) Date of Patent: Jan. 29, 2008

(54) MAGNETIC RECORDING DISK DRIVE WITH PATTERNED MEDIA AND CIRCUIT FOR GENERATING TIMING PULSES FROM THE PATTERN

(75) Inventor: Andreas Moser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 370 days.

(21) Appl. No.: 10/976,997

(22) Filed: Oct. 29, 2004

(65) Prior Publication Data

US 2006/0092541 A1  May 4, 2006

(51) Int. Cl.
*G11B 5/09* (2006.01)
(52) U.S. Cl. .............................. 360/51; 360/46; 360/53; 360/48
(58) Field of Classification Search ...................... None
See application file for complete search history.

(56) References Cited

U.S. PATENT DOCUMENTS

| | | | | |
|---|---|---|---|---|
| 5,517,371 | A * | 5/1996 | Takei | 360/77.08 |
| 5,820,769 | A * | 10/1998 | Chou | 216/22 |
| 5,828,509 | A * | 10/1998 | Yada et al. | 360/51 |
| 5,854,717 | A * | 12/1998 | Minuhin | 360/65 |
| 6,028,728 | A * | 2/2000 | Reed | 360/51 |
| 6,144,517 | A * | 11/2000 | Watanabe et al. | 360/77.04 |
| 6,643,082 | B1 | 11/2003 | Belser | |
| 6,646,822 | B1 * | 11/2003 | Tuttle et al. | 360/46 |
| 6,738,205 | B1 * | 5/2004 | Moran et al. | 360/17 |
| 6,738,207 | B1 * | 5/2004 | Belser et al. | 360/31 |
| 6,751,035 | B1 | 6/2004 | Belser | |
| 6,754,017 | B2 * | 6/2004 | Rettner et al. | 360/51 |
| 6,947,235 | B2 * | 9/2005 | Albrecht et al. | 360/55 |
| 6,982,849 | B2 * | 1/2006 | Nguyen et al. | 360/77.08 |
| 2004/0174627 | A1 * | 9/2004 | Kim et al. | 360/31 |
| 2005/0094301 | A1 * | 5/2005 | Berman et al. | 360/48 |

OTHER PUBLICATIONS

R.L. White et al., "Patterned Media: A Viable Route to 50 Gbit/in2 and Up for Magnetic Recording?", IEEE Transactions on Magnetics, vol. 33, No. 1, Jan. 1997, pp. 990-995.
Howell et al., "Getting the Information in and out: The channel", J. Appl. Phys., vol. 87, No. 9, May 1, 2000, pp. 5371 5376.

\* cited by examiner

*Primary Examiner*—Tan Dinh
*Assistant Examiner*—Dismery Mercedes
(74) *Attorney, Agent, or Firm*—Thomas R. Berthold

(57) ABSTRACT

A magnetic recording disk drive has a patterned magnetic recording disk with data blocks of magnetizable material separated by nonmagnetic regions, a read head for reading the magnetized data blocks and generating a readback signal, and a timing circuitry that generates from the readback signal a series of timing pulses. When the read head is over a nonmagnetic region the readback signal is significantly reduced, and this signal reduction is detectable to determine the position of the nonmagnetic regions. The timing circuitry includes a rectifier that rectifies the readback signal, a highpass filter that filters the rectified signal at the frequency of the data blocks, and a peak detector that detects the peaks of the filtered signal and generates a series of timing pulses, each pulse representing a nonmagnetic region. The timing pulses can be used for marking the bit boundaries in the digital data sequence that is output from the read channel or as the write clock signal to the write head for magnetizing the data blocks.

7 Claims, 5 Drawing Sheets

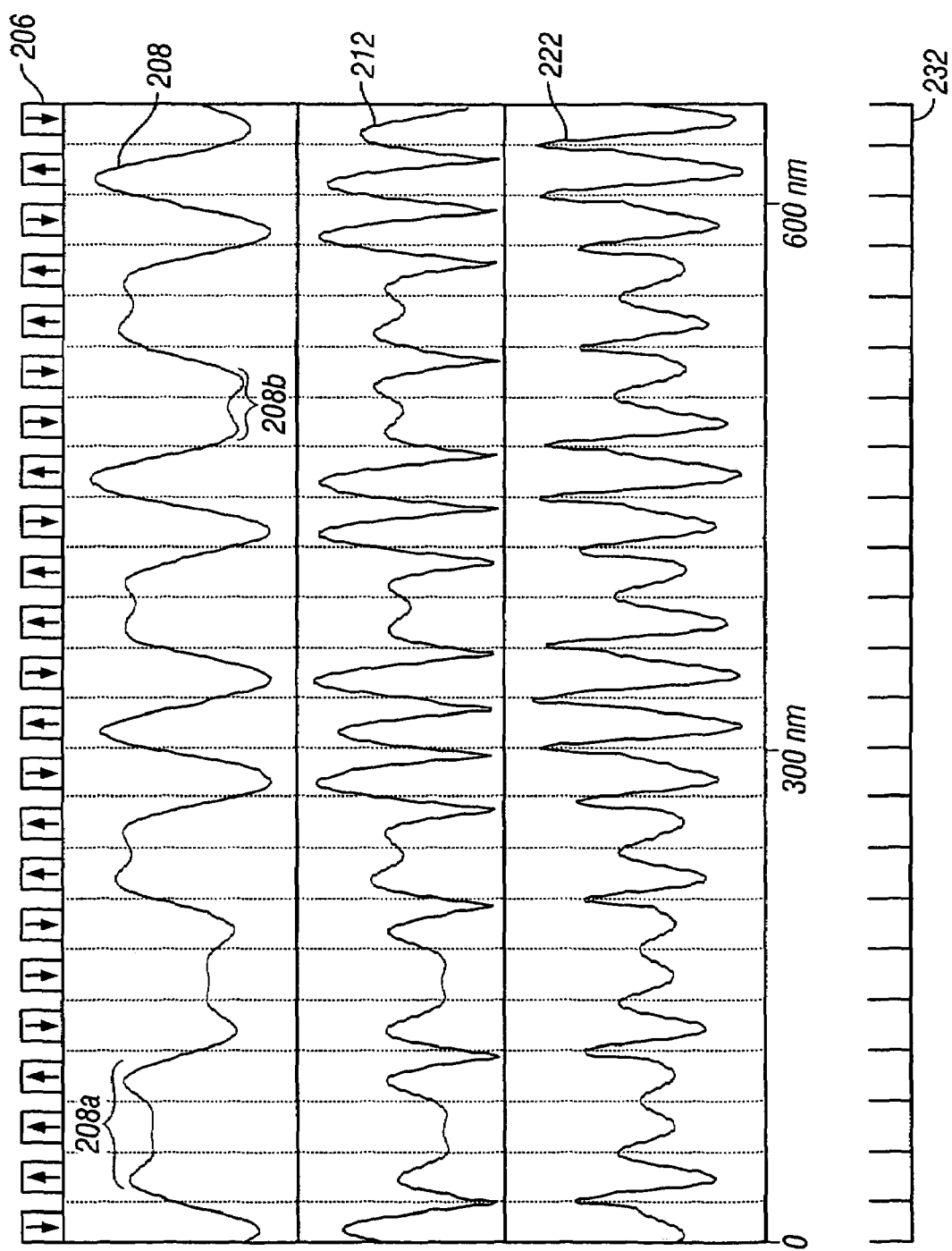

MAGNETIC RECORDING DISK DRIVE WITH PATTERNED MEDIA AND CIRCUIT FOR GENERATING TIMING PULSES FROM THE PATTERN

BACKGROUND OF THE INVENTION

1. Field of the Invention

This invention relates generally to magnetic recording disk drives for use with patterned media, wherein each data bit is stored in a magnetically isolated block on the disk, and more particularly to such a disk drive with an improved clock for reading and writing the data.

2. Description of the Related Art

Magnetic recording disk drives with patterned magnetic recording media have been proposed to increase the data density. In patterned media, the magnetic material is patterned into small isolated blocks or islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording?", *IEEE Transactions on Magnetics*, Vol. 33, No. 1, January 1997, pp. 990-995.

In conventional magnetic recording disk drives, where the data bits are written on continuous (non-patterned) media, the read clock signal for reading the recorded data is driven by the data readback signal. The readback data detector includes a timing recovery circuit that generates a timing error signal that controls the read clock frequency. Because the data must be detected before the timing error signal can be generated, there is always some latency between the data signal and the corrected read clock signal.

Also in conventional disk drives with continuous media, there is no requirement to write to precise positions on the media since all of the media contains magnetic material. However, to write on patterned media using the conventional unsynchronized approach, the media must be patterned perfectly with a single accurate period, and the effective motor speed of the spindle supporting the disks must be highly stable. Together, the accuracy of the media patterning and the stability of the spindle speed have to be such that bits could be written over distances up to 1 mm with positioning accuracy of the bits to about 10 nm. U.S. Pat. No. 6,754,017 describes a magnetic recording disk drive with patterned media that uses a special pattern sensor that senses the data blocks before they pass beneath the write head and generates a write clock signal.

What is needed is a magnetic recording disk drive with patterned media that has an accurate clock signal for reading data from and writing data to the patterned data blocks.

SUMMARY OF THE INVENTION

The invention is a magnetic recording disk drive that has a patterned magnetic recording disk with data blocks of magnetizable material separated by nonmagnetic regions, a read head for reading the magnetized data blocks and generating a readback signal, and a timing circuitry that generates from the readback signal a series of timing pulses. When the read head is over a nonmagnetic region, the readback signal is significantly reduced. This signal reduction is detectable with and without the presence of magnetic transitions in the data blocks adjacent the nonmagnetic regions and is used to determine the position of the nonmagnetic regions. The timing circuitry includes a rectifier that rectifies the readback signal, a highpass filter that filters the rectified signal at the frequency of the data blocks, and a peak detector that detects the peaks of the filtered signal. The peak detector output is a timing signal comprising a series of timing pulses, each pulse representing a nonmagnetic region. The timing pulses can be used for marking the bit boundaries in the digital data sequence that is output from the read channel. The timing pulses can also be used as the write clock signal to the write head for magnetizing the data blocks.

For a fuller understanding of the nature and advantages of the present invention, reference should be made to the following detailed description taken together with the accompanying figures.

BRIEF DESCRIPTION OF THE DRAWINGS

FIG. 6 shows the signal outputs from the timing circuit components in alignment with a sequence of data blocks and nonmagnetic regions from a typical patterned data track.

DETAILED DESCRIPTION OF THE INVENTION

Figure 1:
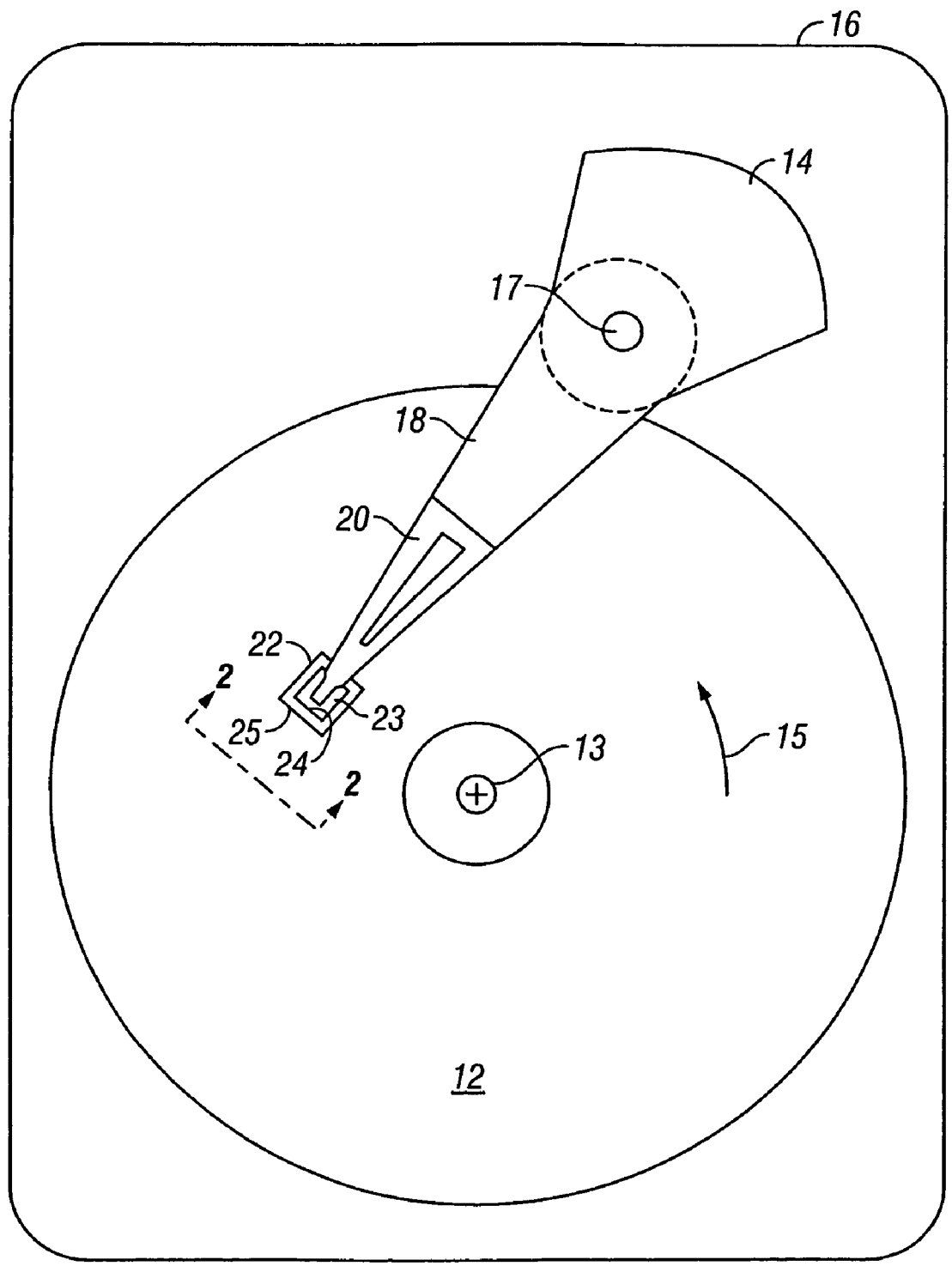
FIG. 1 is a schematic top view of a conventional magnetic recording hard disk drive with the cover removed.

FIG. 1 is a block diagram of a conventional magnetic recording hard disk drive. The disk drive 10 includes a magnetic recording disk 12 and a rotary voice coil motor (VCM) actuator 14 supported on a disk drive housing or base 16. The disk 12 has a conventional magnetic recording layer of continuous magnetic material. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
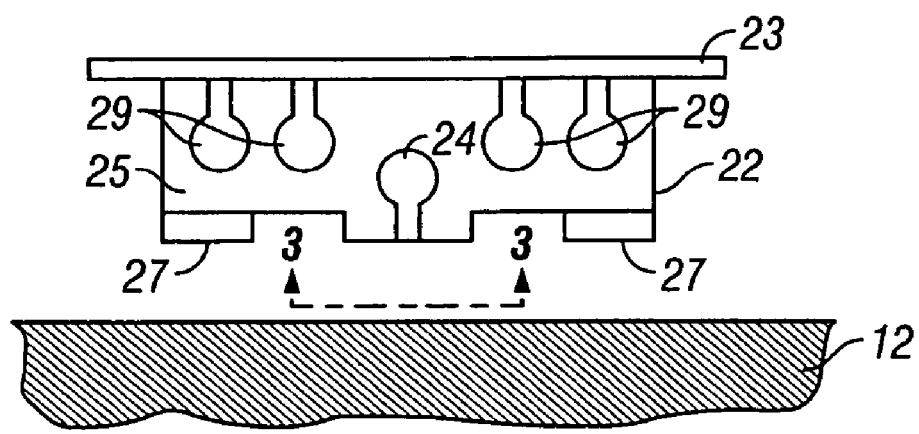
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25.

Figure 3:
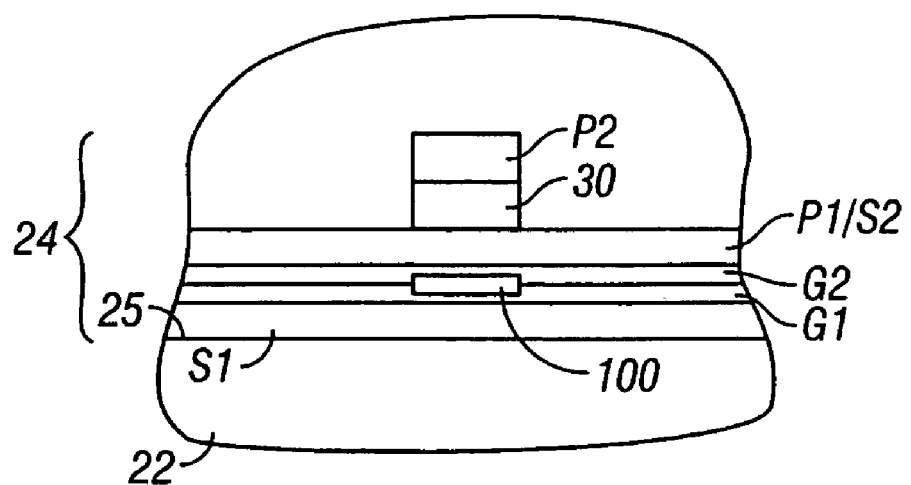
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes magnetic write poles P1/S2 and P1 separated by a write gap 30. The magnetoresistive sensor or read head 100 is located between two insulating gap layers G1, G2 that are typically formed of alumina. Gap layers G1, G2 are located between magnetic shields S1 and P1/S2, with P1/S2 also serving as the first write pole for the write head. If the magnetoresistive read head is the type where the sense current is perpendicular to the planes of the layers, sometimes referred to as a CPP sensor, then the read head is formed in contact with the shields S1, S2, or in contact with electrically conducting leads formed on the shields.

Figure 4:
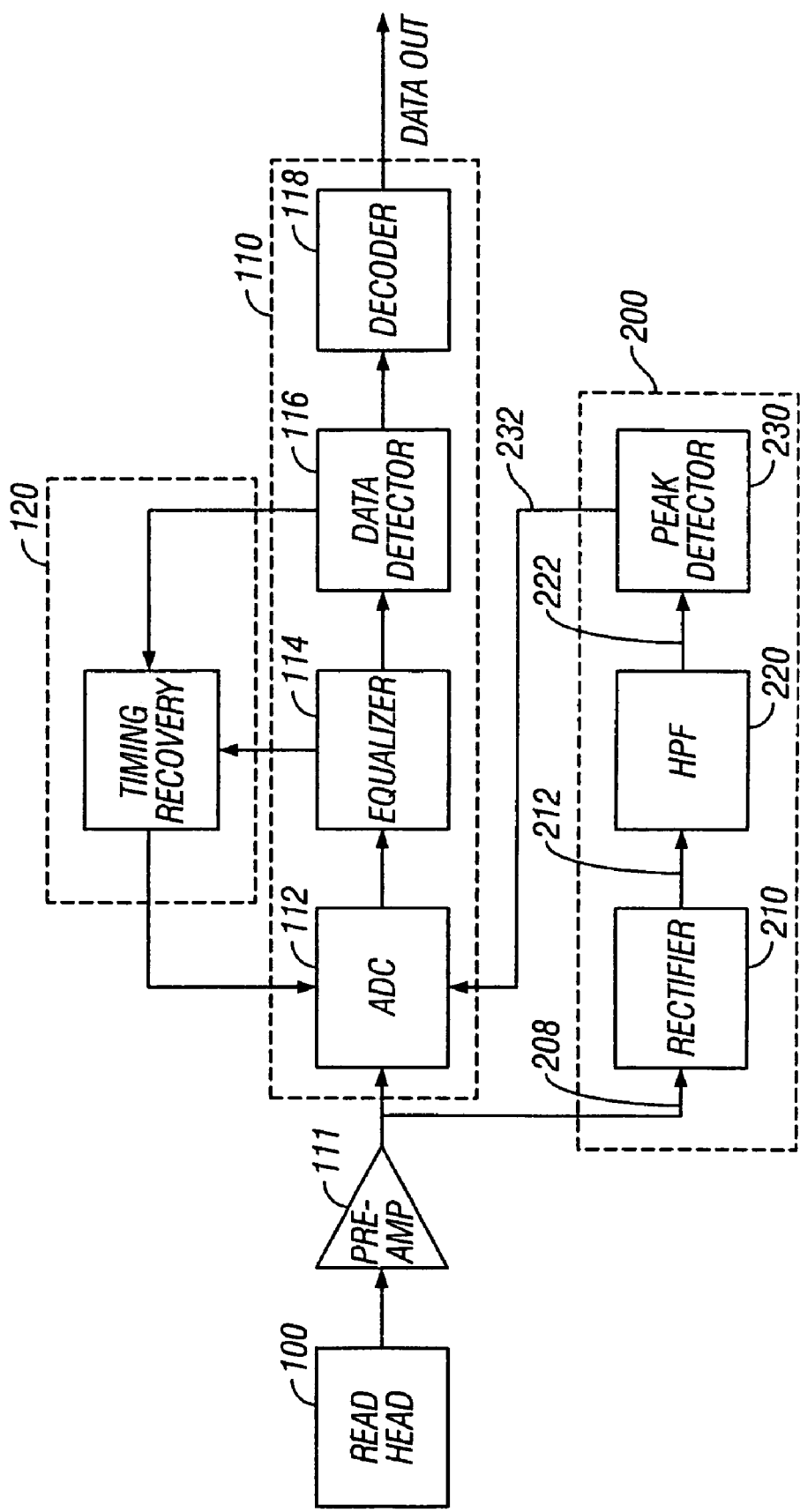
FIG. 4 is a block diagram of a conventional read channel for processing the signal from read head and shows the timing circuitry of the present invention.

FIG. 4 is a block diagram of a conventional read channel 110 for processing the signal from read head 100 as the read head 100 reads the data recorded in the conventional continuous magnetic recording layer of disk 12. The signal detected by read head 100 is sent amplified by preamplifier 111. The channel includes an analog-to-digital converter (ADC) 112 that receives output of preamplifier 111, an equalizer 114, a data detector 116, and a decoder 118. A timing recovery circuit 120 generates a timing error signal from the actual data to adjust the frequency of the read clock. The clock marks the bit boundaries of the digital data output by the data detector 116. The operation of the read channel 110 and timing recovery circuit 120 are well-known, as described for example by Howell et al., "Getting the information in and out: The channel", *J. Appl. Phys., Vol.* 87, No. 9, 1 May 2000, pp. 5371-5376.

Figure 5:
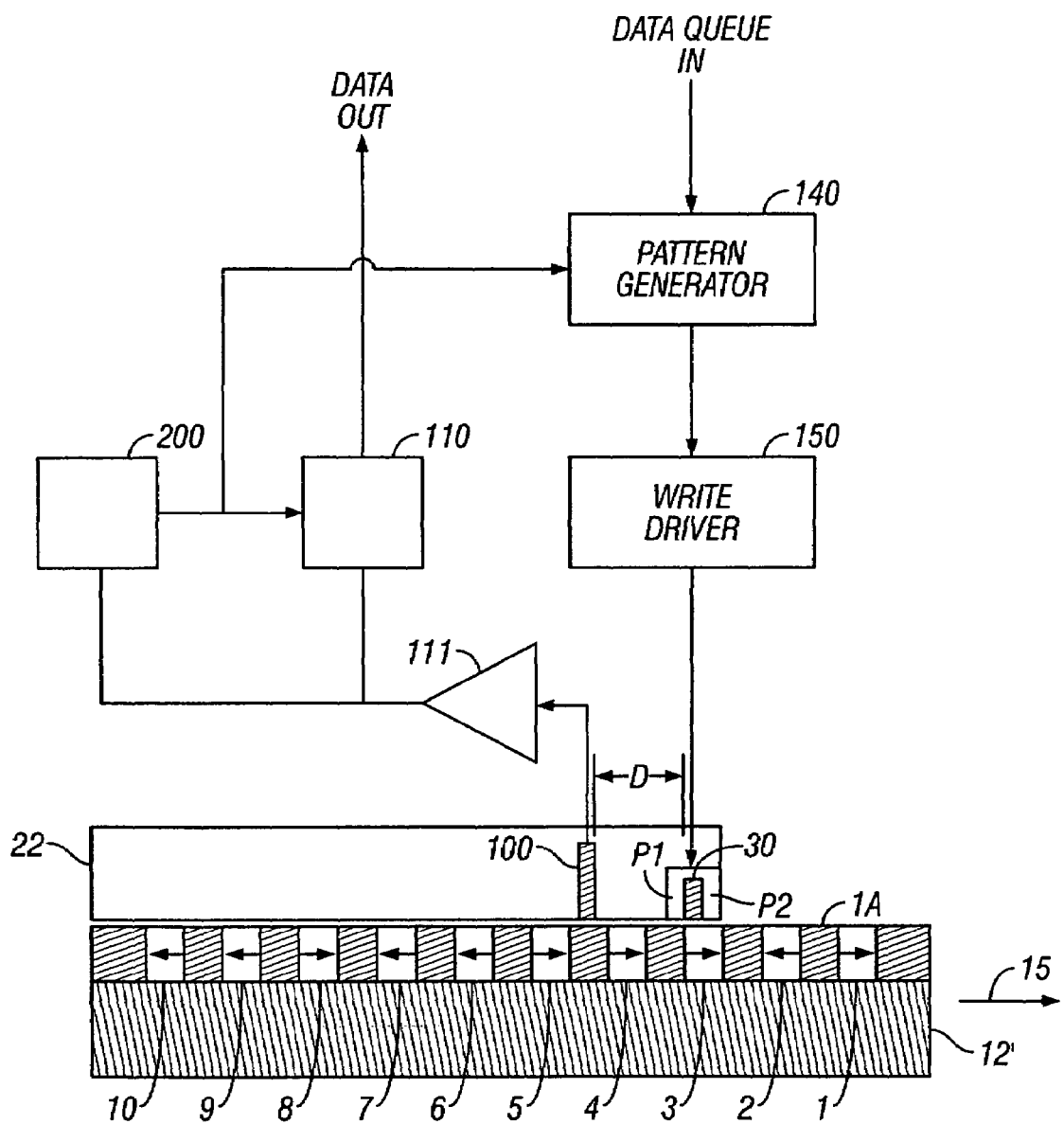
FIG. 5 is a sectional view of a magnetic recording disk with a patterned magnetic recording layer and shows the read and write heads connected to the timing circuitry of the present invention.

The invention will be described for a disk drive like the conventional disk drive described above with respect to FIGS. 1-4, but wherein the disk has a patterned rather than a continuous magnetic recoding layer, and a timing circuitry 200 (FIG. 4) can be used for clocking the reading and writing of data. FIG. 5 shows a sectional view of the modified magnetic recording disk 12' with a magnetic recording layer of patterned media in the form of discrete blocks 1-10 of magnetic material. The air-bearing slider 22 is depicted in sectional view above disk 12' and is shown with the read head 100 and the write head formed of poles P1, P2 and write gap 30.

The blocks 1-10 in FIG. 5 are magnetizable regions of magnetic material on the disk 12' and are aligned along a data track and are spaced apart by nonmagnetic regions, such as region IA between blocks 1 and 2. The term "nonmagnetic" means that the regions between the data blocks are formed of a nonferromagnetic material, such as a dielectric, or a material that has no substantially remanent moment in the absence of an applied magnetic field. The nonmagnetic regions may also be the absence of magnetic material, such as grooves or troughs in the magnetic recording layer or disk substrate. The arrows depicted in the blocks 1-10 represent the magnetic moments or magnetization directions in the blocks, and are depicted for horizontal or in-plane magnetic recording. In a disk drive the data tracks are circular and concentric. As shown in FIG. 5, the blocks are illustrated as being evenly spaced along the track but in reality they would be somewhat unevenly spaced along the data track because of imperfect patterning that can occur during fabrication. While it is common to refer to each block as storing a data "bit", it is actually the transition between the magnetization directions in successive data blocks that represent a data bit in the data channel of the disk drive. The recording or writing of data occurs by the conventional thin film inductive coil write head that has write poles P1, P2 that generate a magnetic field across the write gap 30 to magnetize the blocks in one of the two magnetization directions, depending on the direction of current through the coil of the write head. Because there is no magnetic material between the blocks I-10, the write pulses must be precisely timed to magnetize the appropriate blocks. While FIG. 5 illustrates horizontal or longitudinal patterned media, wherein the blocks 1-10 are depicted with their moments in the plane of the recording layer, the invention is fully applicable to perpendicular patterned media, wherein the blocks 1-10 would be formed of material with perpendicular magnetic anisotropy, and have their moments oriented into and out of the plane of the magnetic recording layer.

Arrow 15 shows the direction of media travel, so that block 1, for example, passes under read head 100 before it passes under the write gap 30. The read head 100 senses the magnetized blocks and sends the signal to pre-amplifier 111, and then to the read channel 110 where the data is detected and decoded and output to the host. The data to be written to the disk 12' is sent from the host to the write channel of the disk drive and directed as a data queue to a pattern generator 140 and then to write driver 150. The output of preamplifier 111 is also sent to timing circuitry 200 of the present invention. The output of timing circuitry 200 is a series of timing pulses that can replace the timing recovery circuit 120 (FIG. 4) in the prior art read channel used with conventional continuous media. The output of timing circuitry 200 can also be used as the clocking signal to pattern generator 140. The phase shift due to the spacing D between the write gap 30 and the read head 100 is used to synchronize the clocking signal. This assures that the pulses from write driver 150 energize the coil of the write head just as the data blocks pass under the write gap 30.

When the read head 100 is over a nonmagnetic region, the readback signal is significantly reduced, even if the magnetization of all data blocks point in the same direction. This signal reduction is used to determine the position of the nonmagnetic regions. If the magnetizations on both sides of a nonmagnetic region point in different directions, the readback signal is also reduced. As a result, the signal is always reduced over a nonmagnetic region. This feature is used to locate the nonmagnetic regions with and without the presence of magnetic transitions. The read head output signal is then rectified, highpass filtered at the frequency of the data blocks and peak detected, which results in timing pulse at each nonmagnetic region.

The timing circuitry 200 is shown in more detail in FIG. 4. It is depicted in FIG. 4 to illustrate how it replaces the prior art timing recovery circuit 120. The timing circuitry 200 includes a rectifier 210, a bandpass or high-pass filter (HPF) 220 and a peak detector 230. The output 232 of peak detector 230 is a series of timing pulses that control the clocking of the read channel 110 to mark the bit boundaries of the data. The timing pulses control the clocking of ADC 112 in the example of FIG. 4 where digitization occurs before the equalizer 114. However, if digitization occurs in the equalizer 114 or after equalization, then the timing pulses are used as the clock for the digitization. While FIG. 4 shows the input 208 to rectifier 210 coming from preamplifier 111, as an alternative the output of equalizer 114 can serve as the input to rectifier 210.

The operation of the components of timing circuit 200 in FIG. 4 will be explained with respect to FIG. 6, where the signal outputs from the circuit components are shown in alignment with a sequence 206 of magnetizable regions (data blocks) and nonmagnetic regions from a typical data track of patterned perpendicular media. No units are displayed on the vertical axes in FIG. 6 because even though the outputs of the circuit components are measured in millivolts (mV), it is the relative changes in the signals 208, 212 and 222 rather than their actual mV values that are of interest.

Each data block in sequence 206 is magnetized either up or down perpendicular to the disk, as shown by the arrows. Each nonmagnetic region has the same length as a data block. The signal 208 is the raw data signal input to rectifier 210. The positive peaks of signal 208 correspond to the up arrows and the negative peaks correspond to the down arrows in sequence 206. For example, the portion 208a corresponds to three consecutive positive bits, and the portion 208b corresponds to two consecutive negative bits.

Signal 212 is the output of rectifier 210. The rectified read back signal 212 contains the signal from the stored data pattern and the signal from the alternation between magnetic and nonmagnetic regions, i.e., the data blocks and the nonmagnetic regions between the data blocks. The local minima of signal 212 correspond to the centers of the nonmagnetic regions. The signal 212 is input to HPF 220. HPF 220 is designed to pass only frequencies above approximately the frequency of the data blocks, or alternatively the filter can be a bandpass filter that passes frequencies between approximately the frequency of the data blocks and twice the frequency of the data blocks. The filter is designed based on the known disk rotation speed and the lengths of the data blocks and nonmagnetic regions. The HPF should be able to handle different linear velocities of the data blocks, depending on the radial position of the read head. The filter and the peak detector can be designed to handle different velocities by optimizing the roll-off behavior of the filter, or the filter frequency can be varied as the radial position of the head changes. The filter frequency can be varied continuously or discretely, depending on which circuitry is easier to implement. The filter frequency does not have to be precisely the frequency of the data blocks and thus can handle a range of linear velocities. For example, if the disk rotational speed is such that the average linear velocity is 20 m/s and the distance between two consecutive data blocks is 30 nm, then the HPF frequency is 667 MHz.

The purpose of HPF 220 is to remove the portion of the rectified signal 210 that is generated by the stored data pattern, so that the HPF output signal 222 contains only the signal from the alternation between magnetic and nonmagnetic regions. The signal 222 is input to peak detector 230 that produces the series of timing pulses 232. Each timing pulse corresponds essentially to the center of a nonmagnetic region in sequence 206.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
    a rotatable magnetic recording disk having a recording layer of magnetizable material, the recording layer having a plurality of generally circular data tracks, each track patterned into discrete data blocks of magnetizable material separated by nonmagnetic regions, each block being magnetizable to represent data bits;
    a head carrier maintained in close proximity to the disk and having a read head for generating a readback signal having positive and negative voltage peaks representing oppositely directed magnetizations from the data blocks in a data track;
    a read channel for generating a digital data sequence from the readback signal from the read head; and
    timing circuitry coupled to the read channel for generating from the readback signal from the read head a series of timing pulses for marking the bit boundaries in the digital data sequence, each pulse representing a nonmagnetic region passing the read head, said timing circuitry comprising a rectifier for rectifying the negative voltage peaks of the readback signal to positive voltage peaks, the rectified positive peaks representing the data blocks and the minima between the rectified positive peaks representing the nonmagnetic regions between the data blocks, a filter for filtering the positive peaks representing the data blocks from the rectified signal, and a peak detector for detecting said minima from the filtered signal, the peak detector output comprising said series of timing pulses.

2. The disk drive of claim 1 wherein the read channel includes a data detector, and wherein the timing pulses are input to the data detector to mark the bit boundaries in the digital data sequence.

3. The disk drive of claim 2 further comprising an equalizer between the read head and the data detector for shaping the input signal to the data detector, and wherein the output of the equalizer is input to the timing circuitry.

4. The disk drive of claim 1 further comprising a write head on the head carrier and coupled to the timing circuitry for magnetizing the data blocks, the timing pulses from the timing circuitry comprising a write clock signal to the write head.

5. The disk drive of claim 1 wherein the filter is a bandpass or highpass filter.

6. The disk drive of claim 1 wherein the magnetized data blocks are magnetized in a direction substantially parallel to the plane of the recording layer.

7. The disk drive of claim 1 wherein the magnetized data blocks are magnetized in a direction substantially perpendicular to the plane of the recording layer.

* * * * *